United States Patent
Akebi et al.

(12)

(10) Patent No.: US 6,353,434 B1
(45) Date of Patent: Mar. 5, 2002

(54) INPUT COORDINATE TRANSFORMATION APPARATUS FOR CONVERTING COORDINATES INPUT FROM A COORDINATE INPUT DEVICE INTO COORDINATES IN A DISPLAY COORDINATE SYSTEM FOR DISPLAYING IMAGES ON A DISPLAY

(75) Inventors: Kazuhiko Akebi, Kyoto; Shinya Nishihara, Kusatsu; Minoru Okabe, Moriyama, all of (JP)

(73) Assignee: Gunze Limited, Kyoto-fu (JP)

( * ) Notice: Subject to any disclaimer, the term of this patent is extended or adjusted under 35 U.S.C. 154(b) by 0 days.

(21) Appl. No.: 09/388,703

(22) Filed: Aug. 2, 1999

(30) Foreign Application Priority Data

Sep. 8, 1998 (JP) ............................ 10-254355

(51) Int. Cl.$^7$ ................................. G09G 5/00
(52) U.S. Cl. ........................................ 345/173
(58) Field of Search ................. 345/173, 174, 345/175, 176, 177, 180

(56) References Cited

U.S. PATENT DOCUMENTS 5,864,335 A * 1/1999 Kuzunuki et al. .......... 345/173

FOREIGN PATENT DOCUMENTS

JP          4260914          9/1992

* cited by examiner

Primary Examiner—Matthew Luu
(74) Attorney, Agent, or Firm—Price and Gess

(57) ABSTRACT

A control program designates two-dimensional coordinates in an image-displaying two-dimensional coordinate system and displays four mark images on a display screen. A touch panel obtains two-dimensional coordinates in a two-dimensional coordinate system inherent in the touch panel according to user operation corresponding to the four mark images. A touch-panel device driver obtains the coefficients in predetermined coordinate transformation expressions according to the two kinds of four coordinates, and performs coordinate transformation using the coordinate transformation expressions to convert two-dimensional coordinates in the touch-panel-inherent two-dimensional coordinate system that have been transmitted from the touch panel into two-dimensional coordinates in the image-displaying two-dimensional coordinate system and transfer the converted coordinates to an operating system.

19 Claims, 6 Drawing Sheets

INPUT COORDINATE TRANSFORMATION APPARATUS FOR CONVERTING COORDINATES INPUT FROM A COORDINATE INPUT DEVICE INTO COORDINATES IN A DISPLAY COORDINATE SYSTEM FOR DISPLAYING IMAGES ON A DISPLAY

This application is based on an application No. 10-254355 filed in Japan, the content of which is hereby incorporated by reference.

BACKGROUND OF THE INVENTION

(1) Field of the Invention

The present invention relates to a conversion device for converting coordinates input by a coordinate input device such as a touch panel, and especially relates to the improvement of a calibration technology with which the position of an image on a display is matched to a position detected at the time of an input operation using the touch panel.

(2) Description of the Prior Art

Recently, touch panels have been widely used as an input device of computers.

A touch panel is a kind of light-transparent two-dimensional coordinate input device. More specifically, a touch panel is composed of a transparent material and is provided on the surface of an image display such as a liquid crystal display. When the user depresses the touch panel with a pen or finger, the touch panel detects the two-dimensional coordinates (x,y) corresponding to the position that is depressed and informs the computer of the detected coordinates.

A touch panel transfers data to the device driver for the touch panel that is a program in the computer via the communication port of the computer.

The device driver for a touch panel converts the coordinates that have been detected by the touch panel in the two-dimensional coordinate system inherent for the touch panel into coordinates in the image-displaying two-dimensional coordinate system, and transfers the converted coordinates to the operating system (referred to as the "OS" in this specification). In addition, the device driver exercises control inherent for the touch panel.

Here, the image-displaying two-dimensional coordinate system is a coordinate system used in the OS running on the computer for displaying images on the display.

For instance, coordinates within the range that is displayed on the display in the image-displaying two-dimensional coordinate system are given by (P,Q) [0≦P≦65535,0≦Q≦65535]. Here, the "P" indicates a horizontal coordinate and the "Q" indicates a vertical coordinate.

On the other hand, two-dimensional coordinates in the touch-panel-inherent two-dimensional coordinate system are given by (X,Y) [0≦X≦1023,0≦Y≦1023]. In the coordinate system, the coordinates corresponding to the upper left corner of the touch panel provided on the display is (0,0), the upper right corner is (1023,0), and the lower left corner is (0, 1023).

The OS defines the interface for receiving coordinates from the coordinate input device such as a mouse and a touch panel, and the received coordinates are transferred to application programs running under the control of the OS. For instance, when the user depresses the touch panel by depressing an icon on the display with a finger, the same operation is to be executed on the computer as the user puts the cursor on the icon with a mouse and click the mouse on the icon.

Note that since the touch-panel-inherent two-dimensional coordinate system is different from the image-displaying two-dimensional coordinate system, the coordinates of an image on the display needs to be matched to coordinates input by the touch panel. For this purpose, calibration is performed. Calibration is performed using a dedicated control program and expressions for coordinate transformation are obtained in advance so that the touch-panel device driver converts two-dimensional coordinates that have been transmitted from the touch panel via the communication port into coordinates in the image-displaying two-dimensional coordinate system.

Here, an explanation of the process of the calibration by a conventional control program will be given.

The calibration process by the conventional control program is to specify Expressions 1 and 2 as coordinate transformation expressions for calculating two-dimensional coordinates (P,Q) in the image-displaying two-dimensional coordinate system from input coordinates (X,Y) in the touch-panel-inherent coordinate system. The Expressions 1 and 2 are given below.

$$P=aX+b \quad \text{(Expression 1)}$$

$$Q=cY+d \quad \text{(Expression 2)}$$

FIG. 1 is a flowchart illustrating the conventional calibration processing according to a control program.

The control program notifies the touch-panel device driver of the start of the calibration processing (step S901). After the notification, the touch-panel device driver informs the OS of coordinates that have been transmitted from the touch panel in the touch-panel-inherent coordinate system without conversion until the notification of the end of the calibration processing. As a result, after the notification at step S901, the control program receives coordinates in the touch-panel-inherent coordinate system via the OS.

The control program displays a message that requests the user to depress a mark with a pen (step S902) and displays the image of the mark at coordinates (13106,13106) in the image-displaying two-dimensional coordinate system (step S903).

FIG. 2 shows a mark image displayed in the calibration process and how the user depresses the touch panel with a pen to indicate the mark.

As a result of step S903, an "X" mark is displayed at the upper left of the display screen on which a touch panel is provided as shown in a condition 921.

Note that the upper left corner and the lower right corner of the display are supposed to be indicated as two-dimensional coordinates (0,0) and (65535,65535) in the image-displaying two-dimensional coordinate system respectively. The control program displays an image at any position on the display via the OS by transferring two-dimensional coordinates in the image-displaying two-dimensional coordinate system to the OS.

A condition 922 shows how the user depresses the touch panel with a pen to indicate the mark image.

When the user depresses the touch panel as shown in the condition 922, the touch panel detects the depressed position and informs the touch-panel device driver of the detected position as the two-dimensional coordinates in the touch-panel-inherent coordinate system via the communication port.

The touch-panel device driver informs the OS of the coordinates transmitted from the touch panel as they are.

The control program obtains the co-ordinates via the OS that the user has depressed (step S904). The obtained coordinates are supposed to be coordinates $(X_1,Y_1)$. At step S904, the process stops and awaits the obtainment of coordinates by the control program.

After obtaining the coordinates $(X_1,Y_1)$, the control program displays another mark image at coordinates (52429, 52429) in the image-displaying two-dimensional coordinate system (step S905).

After displaying the mark image, the control program obtains coordinates in the touch-panel-inherent coordinate system according to the depression of the touch panel by the user as at step S904 (step S906). The coordinates obtained at step S906 are supposed to be coordinates $(X_2,Y_2)$ After obtaining the coordinates $(X_2,Y_2)$, the control program substitutes coordinates (13106,13106) and (52429,52429) into the (P, Q) and coordinates $(X_1,Y_1)$ and $(X_2,Y_2)$ into the (X,Y) in Expressions 1 and 2, which each are coordinate transformation expressions, respectively to obtain coefficients "a", "b", "c", and "d" in the Expressions 1 and 2 and records the coefficients in a file (step S907).

Here, the coefficients "a", "b", "c", "f", and "d" are calculated according to Expressions 3 to 6 given below.

$a=(52429-13106)/(X_2-X_1)$ (Expression 3)

$b=13106-X_1(52429-13106)/(X_2-X_1)$ (Expression 4)

$c=(52429-13106)/(Y_2-Y_1)$ (Expression 5)

$d=13106-Y_1(52429-13106)/(Y_2-Y_1)$ (Expression 6)

The file in which the coefficients "a", "b", "c", and "d" are recorded is referred to by the touch-panel device driver at the start-up time of the OS. After that the touch-panel device driver converts coordinates in the touch-panel-inherent coordinate system into coordinates in the image-displaying two-dimensional coordinate system according to the Expressions 1 and 2 in which the value of the coefficients have been fixed.

After obtaining the coefficients "a", "b", "c", and "d", the control program displays a message indicating the completion of the calibration process on the display screen (step S908) and informs the touch-panel device driver of the completion of the calibration process (step S909).

Note that when informing that the calibration process is completed, the control program informs the touch-panel device driver of the values of the coefficients "a", "b", "c", and "d".

After informed of the completion of the calibration process, the touch-panel device driver converts the coordinates that have been detected by the touch panel into coordinates in the image-displaying two-dimensional coordinate system according to the Expressions 1 and 2 that are coordinate transformation expressions in which the coefficients "a", "b", "c", and "d" have been fixed, and informs the OS of the obtained coordinates. More specifically, when the coordinates that have been detected by the touch panel as the coordinates of the position depressed by the user are supposed to be coordinates (X,Y), the touch-panel device driver calculates "P" and "Q" according to the coordinates (X,Y) using the Expressions 1 and 2, and informs the OS of the calculated coordinates (P,Q).

As has been described, a conventional control program performs the calibration process by having the user depress two positions on the touch panel corresponding to the two mark images on the display screen, and a touch-panel device driver converts coordinates in the touch-panel-inherent coordinate system into coordinates in the image-displaying two-dimensional coordinate system using the Expressions 1 and 2.

Note that the recent research by the inventors of the present invention has revealed that the X and Y-axes of the two-dimensional coordinate system of a touch panel may not exactly intersect orthogonally, or the touch panel may be shifted in the rotation direction at the time of being providing on the display even when the X and Y-axes of the coordinate system of the touch panel exactly intersect orthogonally.

In addition, since an image-displaying two-dimensional coordinate system is defined by the software of an OS and the like, it is not fixed whether the origin is located at the lower left corner, the lower right corner, or another position of the liquid crystal display on which a touch panel is provided. As a result, the image-displaying two-dimensional coordinate system and the touch-panel-inherent two-dimensional coordinate system may have a relation of a 90-degree rotation and the like.

In these cases, the accuracy of the coordinate transformation using the coordinate transformation expressions, Expressions 1 and 2 is low. More specifically, a conventional touch-panel device driver cannot absorb the disagreement between the image-displaying two-dimensional coordinate system according to which images are displayed on the display and the touch-panel-inherent two-dimensional coordinate system. As a result, the user cannot accurately designate a position on a graphical user interface displayed on the display via the touch panel.

SUMMARY OF THE INVENTION

It is accordingly an object of the present invention to provide an input coordinate transformation apparatus that converts coordinates in a coordinate system inherent in a light-transparent two-dimensional coordinate input device such as a touch panel into coordinates in an image-displaying two-dimensional coordinate system more correctly than a conventional coordinate transformation apparatus when the image-displaying two-dimensional coordinate system and the coordinate system inherent in the light-transparent two-dimensional coordinate input device have a relation of any degree of rotation and when the axes do not orthogonally intersect in the coordinate system inherent in the light-transparent two-dimensional coordinate input device. The object of the present invention is to provide an input coordinate transformation method corresponding to the input coordinate transformation apparatus and a display device that realizes the input coordinate transformation apparatus and includes a display.

The above-mentioned object may be achieved by an input coordinate transformation apparatus that converts input coordinates (x,y) into two-dimensional coordinates in an image-displaying two-dimensional coordinate system, the input coordinates (x,y) having been detected in a two-dimensional coordinate system inherent in a light-transparent two-dimensional coordinate input device provided on a display screen by the light-transparent two-dimensional coordinate input device according to reception of user operation, the input coordinate transformation apparatus that informs a computer of the two-dimensional coordinates, the computer having a function of displaying images on the display screen whose positions have been designated using the image-displaying two-dimensional coordinate system, the input coordinate transformation apparatus, may include: a transform function specifying unit for specifying transform functions F(x,y) and G(x,y), which each include variables "x" and "y" and terms of first degree for the variables "x" and "y"; and a coordinate transformation unit for converting the input coordinates (x,y) into two-dimensional coordinates (F(x,y), G(x,y)) in the image-displaying two-dimensional coordinate system using the transform functions that the transform function specifying unit has specified and for informing the computer of the two-dimensional coordinates (F(x,y), G(x,y)).

In the input coordinate transformation apparatus, the coordinate transformation expressions are both functions that include variables "x" and "y" and reflect the components of the dimensions of two-dimensional coordinates in the two-dimensional coordinate system inherent in the light-transparent two-dimensional coordinate input apparatus such as a touch panel when coordinates in the image-displaying coordinate system are converted into coordinate in the two-dimensional coordinate system inherent in the light-transparent two-dimensional coordinate input apparatus. As a result, coordinates in the coordinate system inherent in the light-transparent two-dimensional coordinate input apparatus such as a touch panel may be converted into coordinates in the image-displaying two-dimensional coordinate system more correctly than in conventional coordinate transformation even when the two-dimensional coordinate system inherent in a touch panel and the like and the image-displaying two-dimensional coordinate system have a relation of any degree of rotation and even when the axes do not orthogonally intersect in the two-dimensional coordinate system inherent in a touch panel and the like.

The above-mentioned object may be also achieved by the input coordinate transformation apparatus, the input coordinate transformation apparatus may further include: an adjustment input coordinate storage unit that is an area for storing "n" ["n" is a natural number equal to or greater than 3] two-dimensional coordinates; a displayed coordinate storage unit for storing "n" two-dimensional coordinates ($P_m$, $Q_m$) ["m"=natural numbers from 1 to "n"] in the image-displaying two-dimensional coordinate system; and an adjustment input receiving unit for designating positions using the "n" two-dimensional coordinates that have been stored in the displayed coordinate storage unit, having the computer display images of marks on the display screen that indicate input positions, receiving user operation corresponding to the marks, obtaining "n" input coordinates ($X_m, Y_m$) ["m"=natural numbers from 1 to "n"] that have been detected by the light-transparent two-dimensional coordinate input device, and storing the obtained input coordinates ($X_m, Y_m$) in the adjustment input coordinate storage unit, wherein the transform function specifying unit includes a coefficient specifying unit for specifying, after the adjustment input receiving unit has stored the input coordinates ($X_m, Y_m$) in the adjustment input coordinate storage unit, coefficients of the transform functions F(x,y) and G(x,y) so that the transform functions satisfy expressions $P_m$=F($X_m, Y_m$) ["m"=natural numbers from 1 to "n"] and $Q_m$=G($X_m, Y_m$) ["m"=natural numbers from 1 to "n"] according to the input coordinates ($X_m, Y_m$) ["m"=natural numbers from 1 to "n"] and the two-dimensional coordinates ($P_m, Q_m$) ["m"=natural numbers from 1 to "n"].

In the input coordinate transformation apparatus, the coefficients in the coordinate transformation expressions may be specified by calibration process, so that the individual difference of light-transparent two-dimensional coordinate input apparatus such as touch panel may be absorbed.

More specifically, even when the touch panel is shifted to some extent at the time of being providing on the display in a manufacturing step and when the origin that the operation system has determined is located at the upper left corner, the lower left corner, the upper right corner, and the lower right corner, calibration process may adjust the relation between input positions using the touch panel and the positions of images on the display.

The above-mentioned object may be also achieved by the input coordinate transformation apparatus, wherein the "n" is equal to 4, the transform function F(x,y) is expressed as "ex+fy+gxy+h" using coefficients "e", "f", "g", and "h", the transform function G(x,y) is expressed as "ix+jy+kxy+l" using coefficients "i", "j", "k", and "l", and the coefficient specifying unit specifies the coefficients "e", "f", "g", "h", "i", "j", "k", and "l" so that the expressions $P_m$=F($X_m, Y_m$) ["m"=1, 2, 3, and 4] and $Q_m$=G($X_m, Y_m$) ["m"=1, 2, 3, and 4] are satisfied according to the input coordinates (Xm,Ym) ["m"=1, 2, 3, and 4] and the two-dimensional coordinates ($P_m, Q_m$) ["m"=1, 2, 3, and 4].

In the input coordinate transformation apparatus, even when the touch panel is shifted at the time of being providing on the display, the user depresses only four positions on the touch panel for calibration. After that, any pixel on the display may be correctly designated as a result of the calibration.

The above-mentioned object may be also achieved by the input coordinate transformation apparatus, wherein the four two-dimensional coordinates that have been stored in the displayed coordinate storage unit are located at vertices of a quadrangle on a two-dimensional coordinate plane.

In the input coordinate transformation apparatus, four positions that are not overlapped but have different characteristics on the light-transparent two-dimensional coordinate input device such as a touch panel are used for the calibration. As a result, the accuracy of coordinate transformation may be improved.

The above-mentioned object may be also achieved by the input coordinate transformation apparatus, wherein the light-transparent two-dimensional coordinate input device is a touch panel that detects positions depressed by a user as input coordinates.

In the input coordinate transformation apparatus, the coordinate transformation expressions are both functions that include variables "x" and "y" and reflect the components of the dimensions of two-dimensional coordinates in the two-dimensional coordinate system inherent in the touch panel when coordinates in the image-displaying coordinate system are converted into coordinate in the two-dimensional coordinate system inherent in the light-transparent two-dimensional coordinate input apparatus. As a result, coordinates in the touch-panel-inherent coordinate system may be converted into coordinates in the image-displaying two-dimensional coordinate system more correctly than in conventional coordinate transformation even when the touch-panel-inherent two-dimensional coordinate system and the image-displaying two-dimensional coordinate system have a relation of any degree of rotation and the axes do not orthogonally intersect in the touch-panel-inherent two-dimensional coordinate system.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT

An explanation of a touch panel unit coordinate transformation apparatus according to the embodiment of the present invention will be given below with reference to figures.

(Structure)

Figure 1:
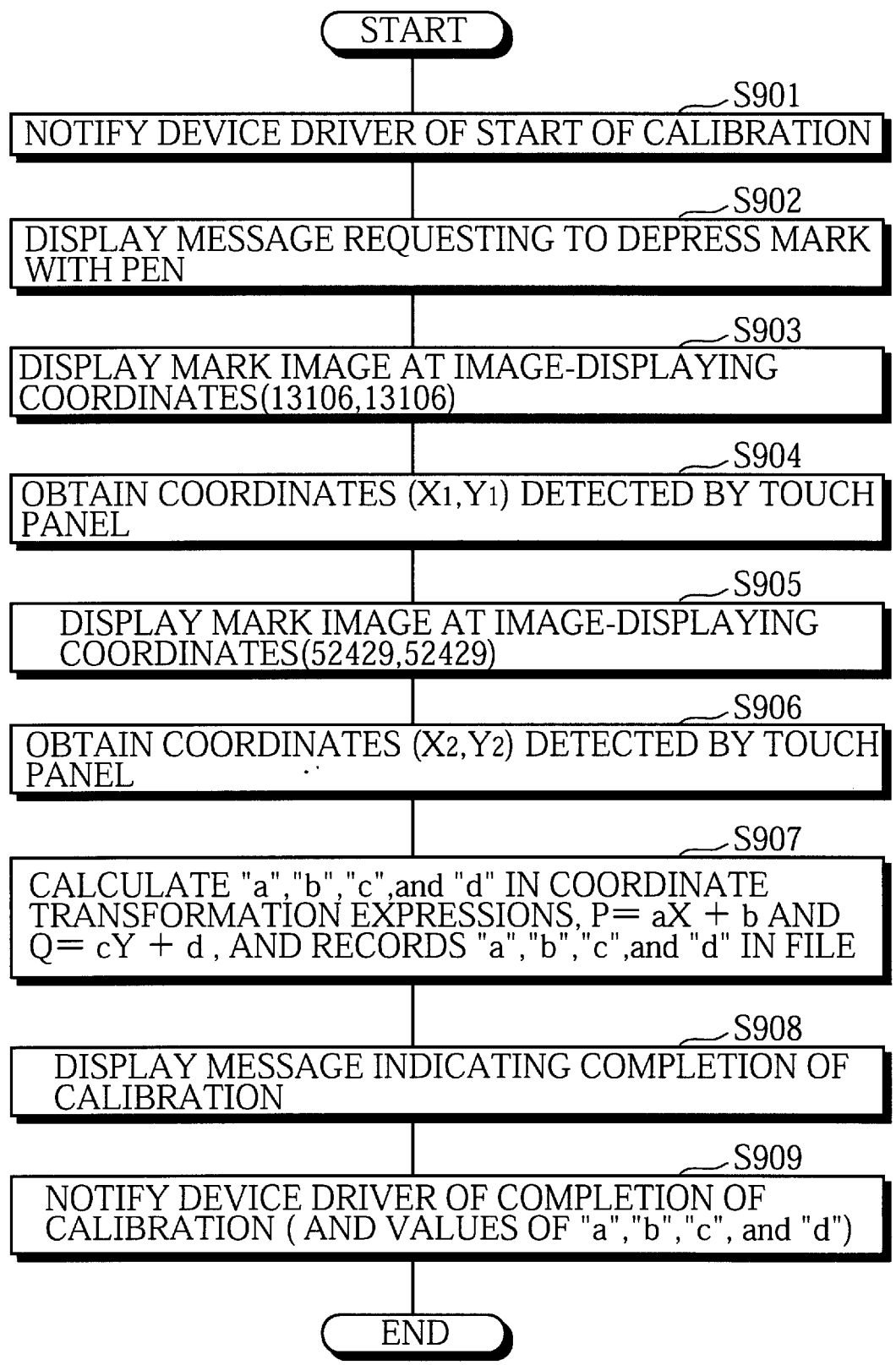
FIG. 1 is a flowchart illustrating calibration processing by a conventional control program.
Figure 2:
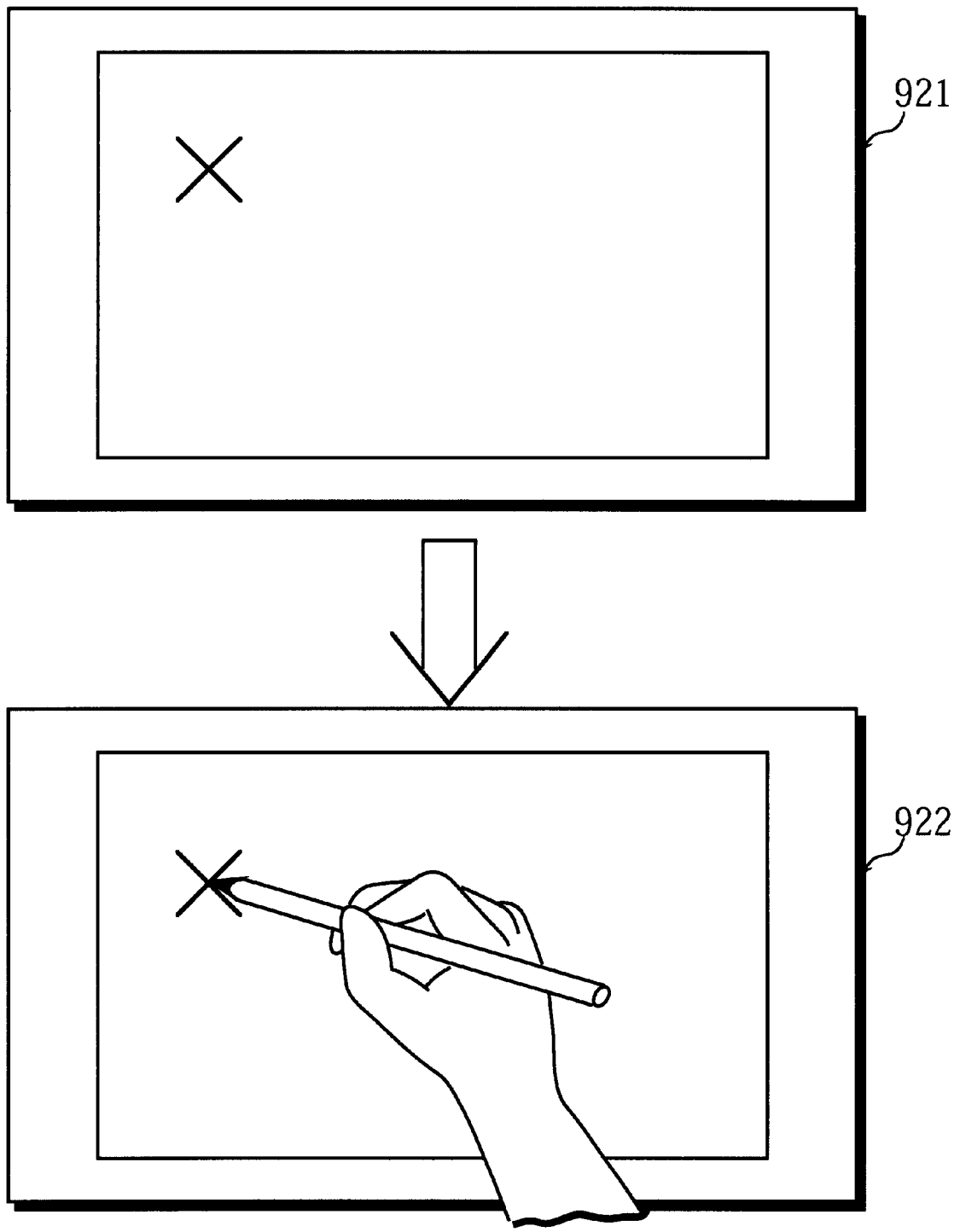
FIG. 2 shows the image of a mark displayed in the calibration process and how the user depresses a touch panel with a pen to indicate the mark.
Figure 3:
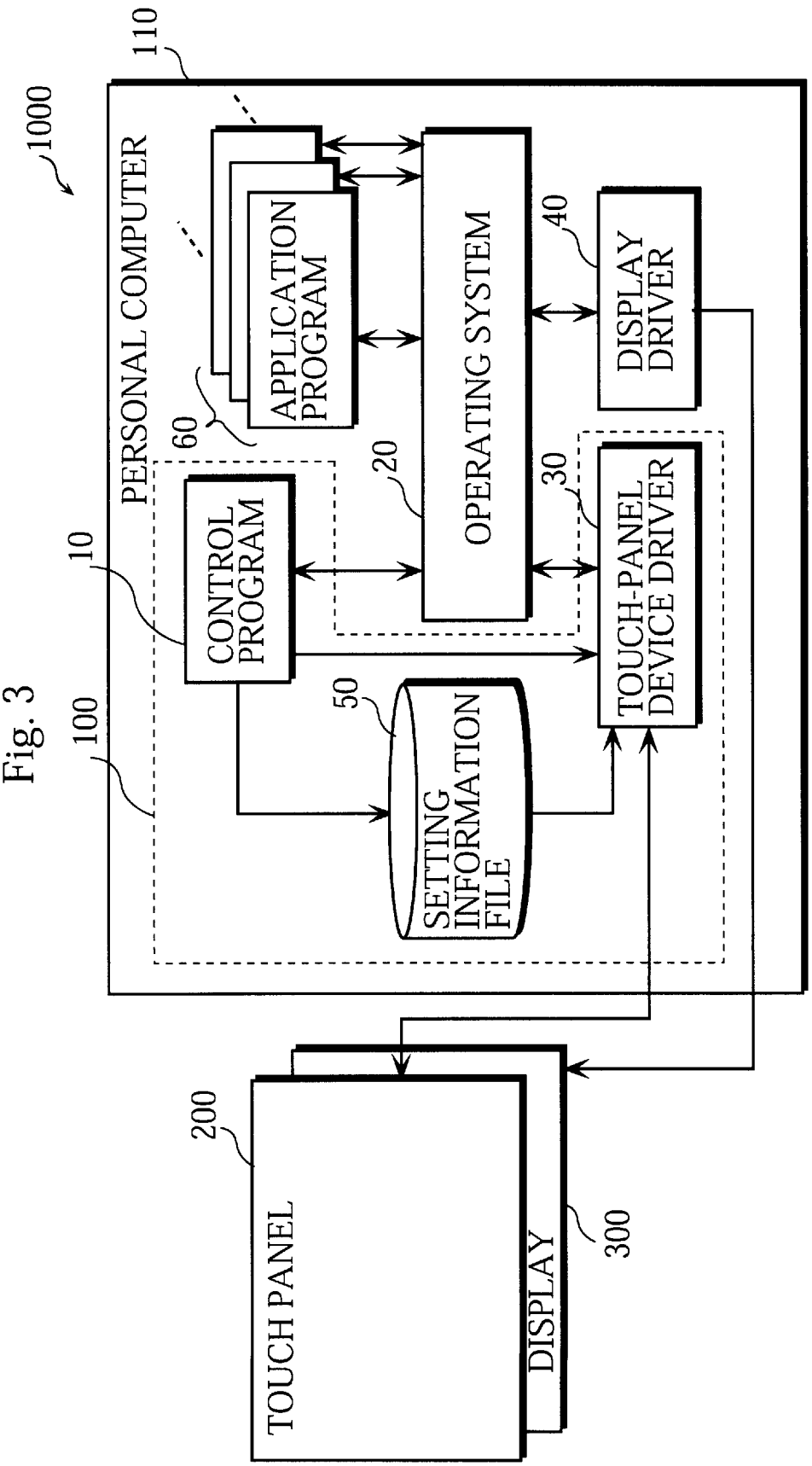
FIG. 3 shows the structure of a personal computer system 1000 that includes a touch panel input coordinate transformation apparatus 100 according to the embodiment of the present invention.

FIG. 3 shows the structure of a personal computer system 1000 that includes a touch panel input coordinate transformation apparatus 100 according to the embodiment of the present invention.

The personal computer system 1000 includes a personal computer 110 that has a CPU, a memory, and a hard disk, a touch panel 200, and a display 300.

The touch panel 200 is composed of a transparent material, and is a resistive film type touch panel. More specifically, the touch panel 200 is formed by laminating two thin film electrodes, each of which has been manufactured by forming a square electrode on one side of a transparent plastic or glass film using a method such as sputtering, so that the electrodes face each other via an appropriate spacer. The touch panel 200 is used for inputting positions and is provided on the display 300. When one position on the touch panel 200 is depressed by the user with a pen or a finger, the touch panel 200 detects two-dimensional coordinates (x,y) [$0 \leq x \leq 1023, 0 \leq y \leq 1023$] corresponding to the depressed position and informs the personal computer 110 of the detected coordinates. The two-dimensional coordinates (x,y) are two-dimensional coordinates in the touch-panel-inherent two-dimensional coordinate system, in which the coordinates of the upper left corner of the touch panel is (0,0), the upper right corner is (1023,0), and the lower left corner is (0,1023).

The personal computer 110 decodes and execute programs stored in the memory using the CPU. FIG. 3 illustrates the personal computer 110 in terms of software.

In the personal computer 110, an operating system (OS) 20, a control program 10, which is executed under the control of the OS 20, a plurality of general purpose application programs 60, a touch-panel device driver 30, and a display driver 40 are executed. Software such as the control program 10, which are executed by the CPU, will be described below as elements that execute functions.

The display driver 40 has a function of controlling the display 300 and displays the image when indicated to draw an image by the OS 20.

The touch-panel device driver 30 receives the two-dimensional coordinates of the position that the user has depressed in the touch-panel-inherent two-dimensional coordinate system from the touch panel via a communication port. The touch panel device driver 30 converts the received two-dimensional coordinates into two-dimensional coordinates in the image-displaying two-dimensional coordinate system, informs the OS 20 of the converted coordinates, and performs other control inherent for touch panel.

Here, the image-displaying two-dimensional coordinate system is used by the OS 20 for displaying images on the display 300. The application programs 60 and the control program 10 displays images on the display 300 Via the OS 20 and the display driver 40 using coordinates in the image-displaying two-dimensional coordinate system.

Note that coordinates displayed on the display 300 in the image-displaying two-dimensional coordinate system are given by (P,Q) [$0 \leq P \leq 65535, 0 \leq Q \leq 65535$]. In the image-displaying two-dimensional coordinate system, the coordinates of the lower left corner of the display 300 is (0,0), the upper left corner is (65535,0), and the lower right corner is (0,65535). As a result, in two-dimensional coordinates (P,Q), the "P" indicates a vertical coordinate and the "Q" indicates a horizontal coordinate.

Figure 4:
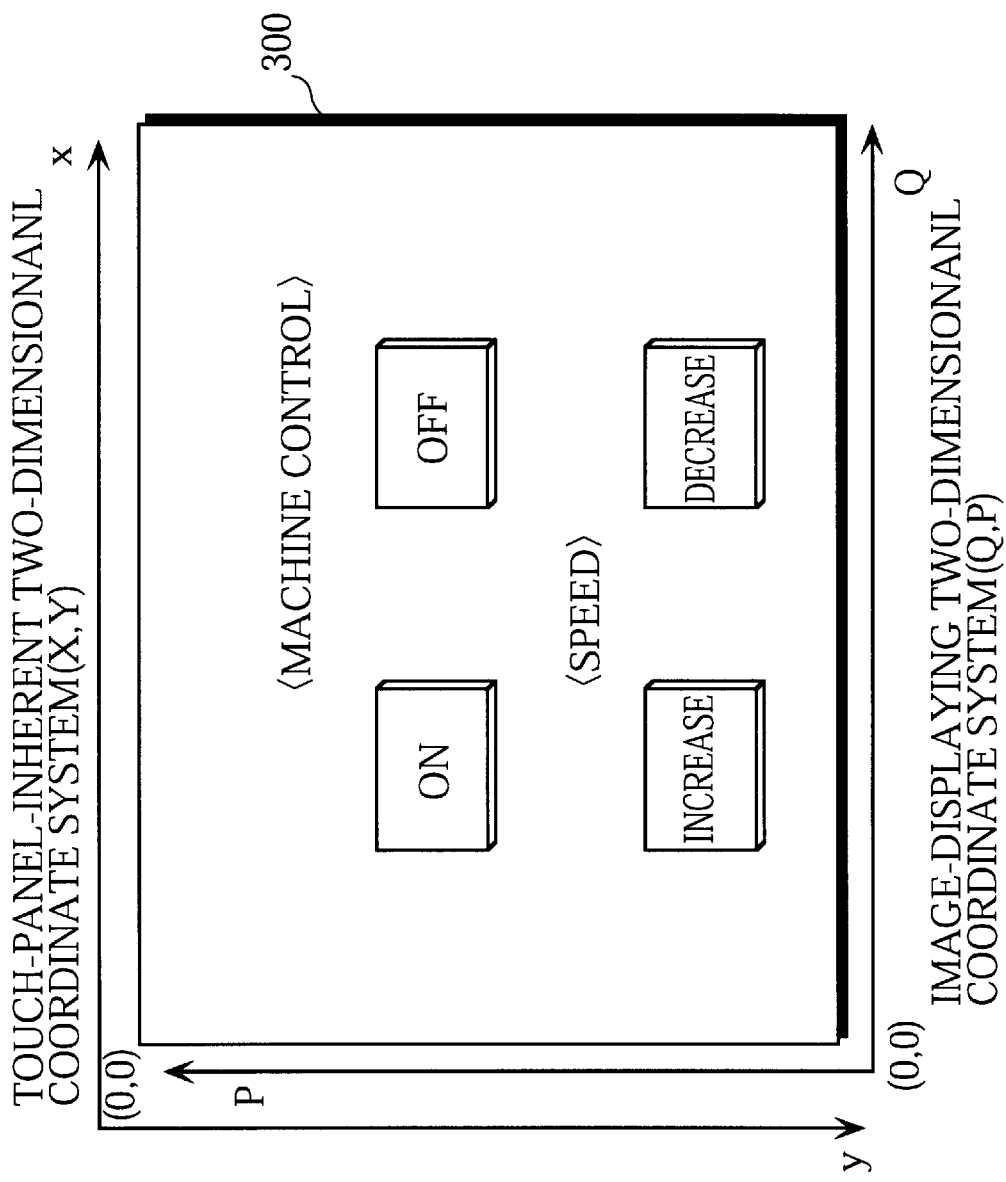
FIG. 4 shows the relation between the image-displaying two-dimensional system and the touch-panel-inherent two-dimensional system.

FIG. 4 shows the relations between the image-displaying two-dimensional system and the touch-panel-inherent two-dimensional system. Note that FIG. 4 shows the display 300 on which images for machine control are displayed and the touch panel 200 is provided on the display 300.

As shown in FIG. 4, the relations between the image-displaying two-dimensional coordinate system used by the OS 20 and the touch-panel-inherent two-dimensional coordinate system are generally scaling, translating, and a 90-degree rotation. In fact, however, the touch panel 200 is shifted to some degree when provided on the display 300, and the X and Y-axes of the two-dimensional coordinate system do not exactly intersect orthogonally on the touch panel 200, so that the relations are somewhat different from those just mentioned.

Expressions 7 and 8 given below are used by the touch-panel device driver 30 in order to calculate two-dimensional coordinates (P,Q) in the image-displaying two-dimensional coordinate system from input coordinates (X,Y) in the touch-panel-inherent coordinate system.

$$P = eX + fY + gXY + h \quad \text{(Expression 7)}$$

$$Q = iX + jY + kXY + l \quad \text{(Expression 8)}$$

The control program 10 executes calibration process for the touch panel 200. More specifically, the control program 10 obtains the values of the coefficients "e", "f", "h", "i", "j", "k", and "l" in the Expressions 7 and 8, stores the obtained values in a setting information file 50, and informs the touch-panel device driver 30 of the obtained values. As a result, after the calibration process, the touch-panel device driver 30 can convert coordinates using the coordinate transformation expressions in which the coefficients have been determined. Note that when calibration precessing has been once executed, the values of the coefficients are stored in the setting information file 50. As a result, after the personal computer 110 is re-activated, the touch-panel device driver 30 obtains the coefficients values by referring to the setting information file 50 and executes coordinate transformation.

The OS 20 sets the interface for receiving coordinates from the touch-panel device driver 30. The OS 20 informs the application programs 60 and the control programs 10 of coordinates that have been transferred from the touch-panel device driver 30 according to the interface.

The interface for receiving coordinates in the OS 20 is a general interface for receiving coordinates that have been detected by a pointing device such as a mouse. As a result, when the user depresses the touch panel 200 as if an icon on the display 300 is depressed with a finger, the same operation is to be executed on the personal computer 110 as the user puts the cursor on the icon with a mouse and click the mouse on the icon.

In this specification, a group of the control program 10, the setting information file 50, and the touch-panel device driver 30 is referred to the touch panel input coordinate transformation apparatus 100.

The touch panel input coordinate transformation apparatus 100 realizes coordinate transform function of converting two-dimensional coordinates in the touch-panel-inherent coordinate system into those in the image-displaying two-dimensional coordinate system.

(Operations)

An explanation of operations by the touch panel input coordination transformation apparatus will be given below.

At the outset, calibration process needs to be executed by the control program 10 for correct coordinate transformation by the touch-panel device driver 30. For instance, at the time of installation of the touch panel 200, the control program 10 is invoked from the program for installation and calibration process is executed.

Figure 5:
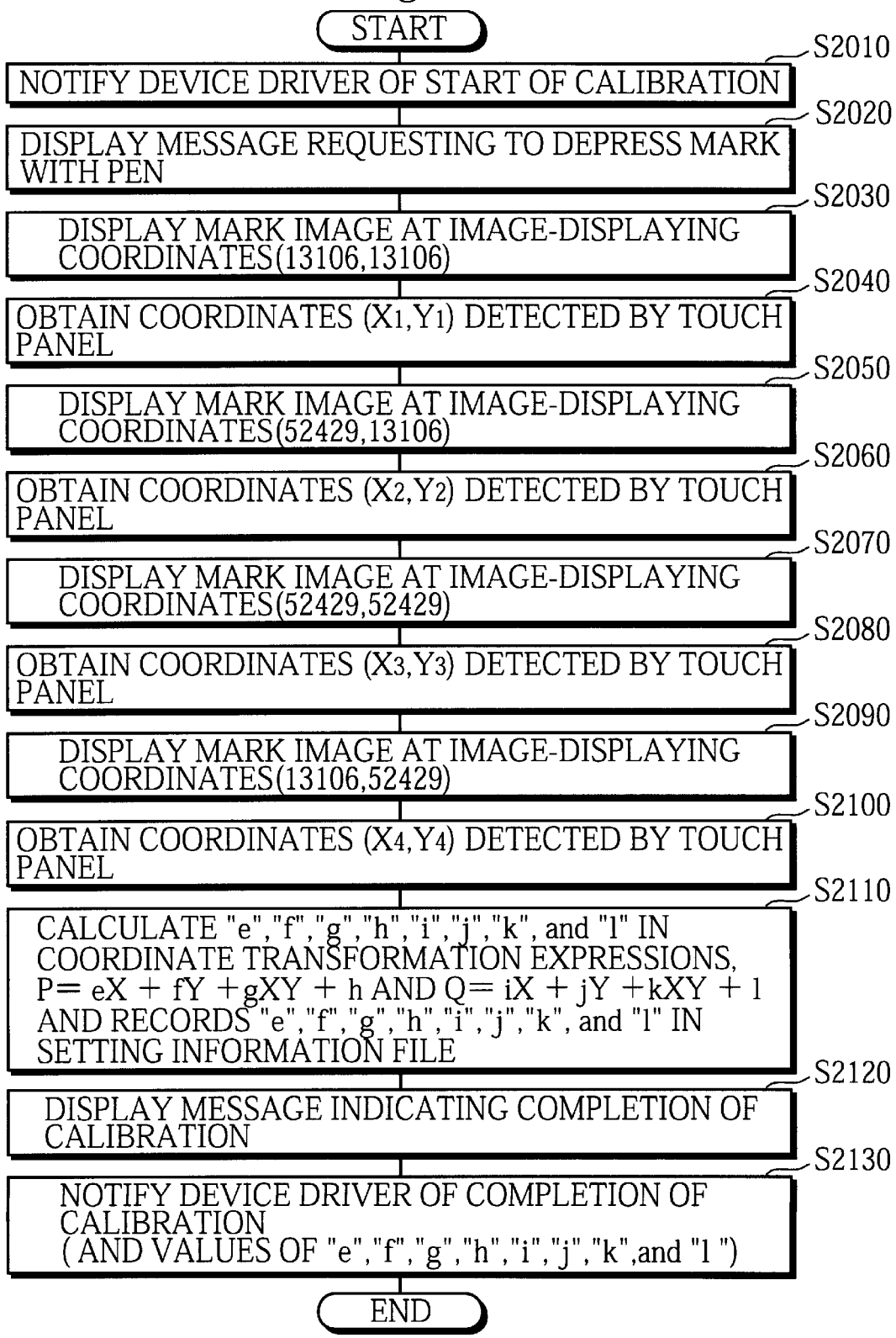
FIG. 5 is a flowchart illustrating calibration processing by the control program 10.

FIG. 5 is a flowchart illustrating calibration processing by the control program 10.

The control program 10 informs the touch-panel device driver 30 of the start of calibration processing (step S2010). After the notification, the touch-panel device driver 30 informs the OS 20 of coordinates that have been transmitted from the touch panel 200 in the touch-panel-inherent two-dimensional coordinate system without conversion until the notification of the end of the calibration processing. As a result, after the notification at step S2010, the control program 10 receives coordinates in the touch-panel-inherent two-dimensional coordinate system via the OS 20.

The control program 10 displays a message that requests the user to depress a mark with a pen (step S2020) and displays the image of the mark at coordinates (13106,13106) in the image-displaying two-dimensional coordinate system (step S2030).

The control program 10 displays mark images on the display 300 via the OS 20 by transferring coordinates in the image-displaying two-dimensional coordinate system to the OS 20.

Figure 6:
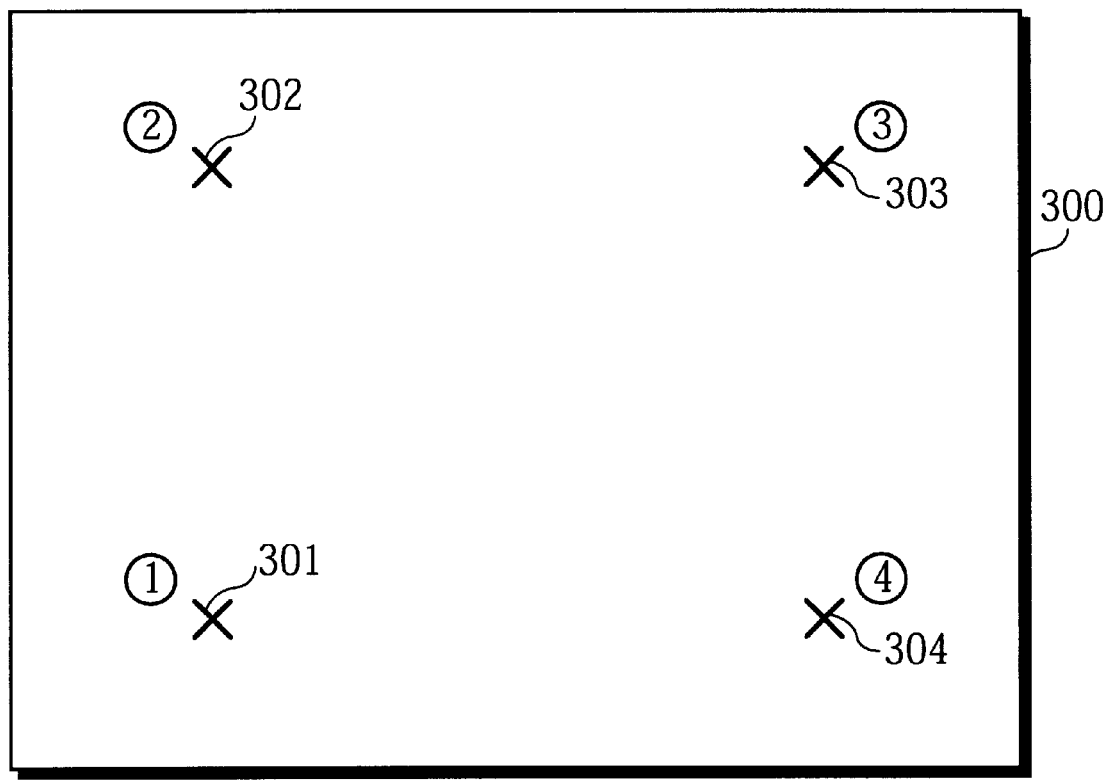
FIG. 6 shows the positions and display order of mark images displayed in the calibration process.

FIG. 6 shows the positions and display order of mark images displayed in the calibration process.

In FIG. 6, the circled figures indicate the order in which the mark images are displayed. A mark image 301 of an "X" mark indicated by ① is displayed at step S2030. Note that just after step S2030, mark images 302 to 304 are not displayed.

After displaying the mark image 301 of the "X" mark, the control program 10 waits for the user to depress a position on the touch panel 200 corresponding to the mark image with a pen.

When the user depresses the touch panel 200, the touch panel 200 detects the position that the user has depressed and informs the touch-panel device driver 30 of the detected position as coordinates in the touch-panel-inherent two-dimensional coordinate system via the communication port.

The touch-panel device driver 30 informs the OS 20 of the coordinates that have been transmitted from the touch panel 200 as they are.

The control program 10 obtains the coordinates of the position that the user has depressed via the OS 20 (step S2040). The obtained coordinates are supposed to be ($X_1$, $Y_1$). Note that light passes through the touch panel 200, so that the user seems to depress a mark image itself on the display 300 with a pen.

After obtaining coordinates ($X_1,Y_1$), the control program 10 displays a mark image 302 at coordinates (52429,13106) in the image-displaying two-dimensional coordinate system as shown by the circled figure ② in FIG. 6 (step S2050).

Note that the numerical values 13106 and 52429, which have been and will be used for two-dimensional coordinates for displaying mark images, have been determined for displaying marks at the positions 20% and 80% of the height and width of the display screen.

After displaying the mark image 302, the control program 10 obtains coordinates in the touch-panel-inherent two-dimensional coordinate system according to the user depression of the touch panel 300 as at step S2040 (step S2060). The coordinates obtained here are supposed to be ($X_2,Y_2$).

After obtaining the coordinates ($X_2,Y_2$), the control program 10 displays a mark image 303 at coordinates (52429, 52429) in the image-displaying two-dimensional coordinate system as shown by the circled figure ③ in FIG. 6 (step S2070), and obtains coordinates ($X_3,Y_3$) in the touch-panel-inherent two-dimensional coordinate system according to user depression of the touch panel 200 (step S2080).

After obtaining the coordinates ($X_3,Y_3$), the control program 10 displays a mark image 304 at coordinates (13106, 52429) in the image-displaying two-dimensional coordinate system as shown by the circled figure ④ in FIG. 6 (step S2090), and obtains coordinates ($X_4,Y_4$) in the touch-panel-inherent two-dimensional coordinate system according to user depression of the 10 touch panel 200 (step S2100).

The control program 10, which has obtained the coordinates ($X_1,Y_1$), ($X_2,Y_2$), ($X_3,Y_3$), and ($X_4,Y_4$), relates the coordinates (13106,13106), (52429,13106), (52429,52429), and (13106,52429) to the corresponding coordinates ($X_1$, $Y_1$), ($X_2, Y_2$), ($X_3,Y_3$), and ($X_4,Y_4$), and substitutes the coordinates into the (X,Y) and (P,Q) in the Expressions 7 and 8. The control program 10 obtains the coefficients "e", "f", "g", "h", "i", "j", "k", and "l" in the Expressions 7 and 8 and stores the obtained coefficients in the setting information file 50 (step S2110).

More specifically, the control program 10 calculates the coefficients "e", "f", "g", "h", "i", "j", "k", and "l" so that the four positions indicated by the coordinates in the touch-panel-inherent two-dimensional coordinate system and in the image-displaying two-dimensional coordinate system satisfy the relations in the Expressions 7 and 8.

Here, the coefficients "e", "f", "g", "h", "i", "j", "k", and "l" are calculated by the control program 10 using Expressions 9 to 16 given below. Note that each of the coefficients is supposed to be obtained as a four-byte value using a floating-point arithmetic.

$$e=-(52429-13106)\{(Y_2-Y_3)(X_4Y_4-X_1Y_1)-(Y_4-Y_1)(X_2Y_2-X_3Y_3)\}/$$
$$[(X_1-X_2)\{$$
$$(Y_2-Y_3)(X_4Y_4-X_1Y_1)-(Y_4-Y_1)(X_2Y_2-X_3Y_3)\}+$$
$$(X_3-X_2)\{(Y_1-Y_2)(X_4Y_4-X_1Y_1)-(Y_4-Y_1)(X_1Y_1-X_2Y_2)\}+(X_4-X_1)\{$$
$$(Y_1-Y_2)(X_2Y_2-X_3Y_3)-(Y_2-Y_3)(X_1Y_1-X_2Y_2)\}] \quad \text{(Expression 9)}$$

$$f=(52429-13106)\{(X_2-X_3)(X_4Y_4-X_1Y_1)-(X_4-X_1)(X_2Y_2-X_3Y_3)\}/$$
$$[(X_1-X_2)\{(Y_2-Y_3)$$
$$(X_4Y_4-X_1Y_1)-(Y_4-Y_1)(X_2Y_2-X_3Y_3)\}+(X_3-X_2)\{(Y_1-Y_2)$$
$$(X_4Y_4-X_1Y_1)-(Y_4-Y_1)(X_1Y_1-X_2Y_2)\}+(X_4-X_1)\{(Y_1-Y_2)(X_2Y_2-X_3Y_3)-$$
$$(Y_2-Y_3)(X_1Y_1-X_2Y_2)\}] \quad \text{(Expression 10)}$$

$$g=-(52429-13106)\{(X_2-X_3)(Y_4-Y_1)-(X_4-X_1)(Y_2-Y_3)\}/[(X_1-$$
$$X_2)\{(Y_2-Y_3)(X_4Y_4-X_1Y_1)-(Y_4-Y_1)(X_2Y_2-X_3Y_3)\}+$$
$$(X_3-X_2)\{(Y_1Y_2)(X_4Y_4-X_1Y_1)-(Y_4-Y_1)(X_1Y_1-X_2Y_2)\}+(X_4-X_1)\{(Y_1-$$
$$Y_2)$$
$$(X_2Y_2-X_3Y_3)-(Y_2-Y_3)(X_1Y_1-X_2Y_2)\}] \quad \text{(Expression 11)}$$

$$h=13106-eX_1-fY_1-gX_1Y_1 \quad \text{(Expression 12)}$$

$i=(52429-13106)\{(Y_1-Y_2)(X_3Y_3-X_4Y_4)-(Y_3-Y_4)(X_1Y_1-X_2Y_2)\}/$
$\quad [(X_1-X_2)\{(Y_2-Y_3)(X_3Y_3-X_4Y_4)-(Y_3-Y_4)$ $(X_2Y_2-X_3Y_3)\}+(X_3-X_2)\{(Y_1-Y_2)(X_3Y_3-X_4Y_4)-(Y_3-Y_4)(X_1Y_1-X_2Y_2)\}+(X_3-X_4)\{$ $\quad (Y_1-Y_2)(X_2Y_2-X_3Y_3)-(Y_2-Y_3)(X_1Y_1-X_2Y_2)\}]$ (Expression 13)

$j=-(52429-13106)\{(X_1-X_2)(X_3Y_3-X_4Y_4)-(X_3-X_4)(X_1Y_1-X_2Y_2)\}/$
$\quad [(X_1-X_2)\{(Y_2-Y_3)$ $(X_3Y_3-X_4Y_4)-(Y_3-Y_4)(X_2Y_2-X_3Y_3)\}+(X_3-X_2)\{(Y_1-Y_2)(X_3Y_3-X_4Y_4)-(Y_3-Y_4)(X_1Y_1-X_2Y_2)\}+(X_3-X_4)\{$ $\quad (Y_1-Y_2)(X_2Y_2-X_3Y_3)-(Y_2-Y_3)(X_1Y_1-X_2Y_2)\}]$ (Expression 14)

$k=(52429-13106)\{(X_1-X_2)(Y_3-Y_4)-(X_3-X_4)(Y_1-Y_2)\}/[(X_1-X_2)\{(Y_2-Y_3)(X_3Y_3-X_4Y_4)-(Y_3-Y_4)(X_2Y_2-X_3Y_3)\}+$ $(X_3-X_2)\{(Y_1-Y_2)(X_3Y_3-X_4Y_4)-(Y_3-Y_4)(X_1Y_1-X_2Y_2)\}+(X_3-X_4)\{(Y_1-Y_2)$ $(X_2Y_2-X_3Y_3)-(Y_2-Y_3)(X_1Y_1-X_2Y_2)\}]$ (Expression 15)

$l=13106-iX_1-jY_1-kX_1Y_1$ (Expression 16)

The file in which the coefficients "e" to "l" have been recorded is referred to by the touch-panel device driver 30 at the time of activation of the OS 20. After that the touch-panel device driver 30 converts coordinates in the touch-panel-inherent two-dimensional coordinate system into those in the image-displaying two-dimensional coordinate system according to the Expressions 7 and 8 in which the coefficients have been determined.

After obtaining the coefficients "e" to "l", the control program 10 displays a message indicating the completion of the calibration process on the display screen (step S2120), and informs the touch-panel device driver 30 of the calibration completion (step S2130). With the notification of the calibration completion, the control program 10 informs the touch-panel device driver 30 of the values of the coefficients "e" to "l".

After the calibration process, which has been described, the touch-panel device driver 30 converts the coordinates that have been detected by the touch panel 200 in response to the user depression into coordinates in the image-displaying two-dimensional coordinate system according to the coordinate transformation expression, the Expressions 7 and 8 in which the coefficients "e" to "l" have been determined. The touch-panel device driver 30 informs the OS 20 of the converted coordinates.

More specifically, when the coordinates of a position that the touch panel 200 has detected according to user depression are supposed to be (X,Y), the touch-panel device driver 30 calculates "P" and "Q" using the Expressions 7 and 8 according to the coordinates (X,Y), and informs the OS 20 of the calculated coordinates (P,Q).

(Examination)

As is evident from the comparison between the Expressions 1 and 2, and the Expressions 7 and 8, the touch panel input coordinate transformation apparatus 100 according to the present invention converts two-dimensional coordinates in the touch-panel-inherent two-dimensional coordinate system into those in the image-displaying two-dimensional coordinate system more correctly than a conventional apparatus.

More specifically, displacement in the Y direction in the touch-panel-inherent two-dimensional coordinate system is indicated only as displacement in the Q direction in the image-displaying two-dimensional coordinate system according to the Expressions 1 and 2, so that the conventional control program cannot deal with a case in which the relationship between the two coordinate systems is a 90-degree of rotation. On the other hand, displacement in the Y direction in the touch-panel-inherent two-dimensional coordinate system can be indicated as displacement in either of the P and Q directions in the image-displaying two-dimensional coordinate system according to the Expressions 7 and 8, so that the touch panel input coordinate transformation apparatus 100 can deal with a case in which the relationship between the two coordinate systems is a 90-degree of rotation.

As has been described in the embodiment, the calibration process in which four positions are indicated realizes coordinate transformation that is correct enough for actual use even if the touch panel is shifted so that the two coordinate systems have a relation of rotation, part of the touch panel is shifted in a direction that is perpendicular to the plane of the display, the touch panel is a trapezium and the X and Y-axes of the touch-panel-inherent two-dimensional coordinate system do not exactly intersect orthogonally on the touch panel.

While an explanation of the touch panel input coordinate transformation apparatus 100 has been given according to the embodiment, the present invention is not limited to the embodiment.

(1) While the origin of the touch-panel-inherent two-dimensional coordinate system is supposed to be located at the upper left corner of the display screen on which the touch panel has been provided in the present embodiment, the origin can be located anywhere, for instance, at the lower left corner.

(2) While the control program calculates the coefficients in the coordinate transformation and informs the device driver of the calculated coefficients in the calibration process in the present embodiment, the share of the operations in the calibration process by the control program and the device drive is not limited to the example in the embodiment. For instance, the control program may inform the device driver of the two-dimensional coordinates of a mark image in the image-displaying two-dimensional coordinate system, and the device driver that has received the image mark coordinates may obtain coordinates input by the user, require the control program to provide the coordinates of the next mark image, and repeat the requirement of the next mark image and the obtainment of coordinates input by the user to calculate the coefficients of the coordinate transformation.

(3) While the two-dimensional coordinates are supposed to be displayed at positions 20% and 80% of the height and width of the display screen in the present embodiment, the coordinates may be displayed at positions 25% and 75% of the height and width, for instance. Note that it is desirable that the four positions keep their distance from each other to some extent. In addition, while the coefficients "e" to "l" are supposed to be calculated as four-byte values using a floating-point arithmetic in the present embodiment, the coefficients may be eight-byte values.

(4) While the touch panel input coordinate transformation apparatus 100 converts coordinates using the Expressions 7 and 8 according to the calibration in which four positions are indicated in the present embodiment, two-dimensional coordinates (X,Y) in the touch-panel-inherent two-dimensional coordinate system may be converted into two-dimensional coordinates (P,Q) in the image-displaying two-dimensional coordinate system using Expressions 17 and 18 given below according to calibration in which three positions are indicated, for instance. By doing so, coordinates can be somewhat correctly converted even if a relation between the two coordinate systems is rotation.

$$P = eX + fY + g \quad \text{(Expression 17)}$$

$$Q = hX + iY + j \quad \text{(Expression 18)}$$

Note that the coefficients "e", "f", "g", "h", "i", and "j" can be calculated by repeating three times the display of a mark image on the display and the obtainment of the coordinates corresponding to the mark image in the touch-panel-inherent two-dimensional coordinate system according to user depression, and by substituting the obtained three sets of coordinates into the Expressions 17 and 18.

(5) The two-dimensional coordinate input device that is provided on the display is a touch panel in the present embodiment, the two-dimensional coordinate input device is not limited to touch panel. The two-dimensional coordinate input device must let light pass through itself but may not receive depression and detect the depressed position.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. An input coordinate transformation apparatus that converts input coordinates (x,y) into two-dimensional coordinates in an image-displaying two-dimensional coordinate system, the input coordinates (x,y) having been detected in a two-dimensional coordinate system inherent in a light-transparent two-dimensional coordinate input device provided on a display screen by the light-transparent two-dimensional coordinate input device according to reception of user operation, the input coordinate transformation apparatus that informs a computer of the two-dimensional coordinates, the computer having a function of displaying images on the display screen whose positions have been designated using the image-displaying two-dimensional coordinate system, the input coordinate transformation apparatus, comprising:

a storage medium;

transform function specifying means for
  (1) obtaining input coordinates corresponding to three or more positions detected by the light-transparent two-dimensional coordinate input device as a result of user operation in which the user designates the three or more positions,
  (2) specifying transform functions F(x,y) and G(x,y) according to the input coordinates, each transform function include variables "x" and "y" and terms of first degree for the variables "x" and "y", and
  (3) recording numerical information that is required for the specification as a setting information file on the storage medium; and coordinate transformation means for
  (1) accessing the setting information file to read the numerical information,
  (2) converting the input coordinates (x,y) into two-dimensional coordinates (F(x,y), G(x,y)) in the image-displaying two-dimensional coordinate system using the transform functions specified by the numerical information, and
  (3) informing the computer of the two-dimensional coordinates (F(x,y), G(x,y)).

2. The input coordinate transformation apparatus according to claim 1, wherein the transform function specifying means comprises:

adjustment input coordinate storage means that is an area for storing "n" (wherein "n" is a natural number equal to or greater than 3) two-dimensional coordinates;

displayed coordinate storage means for storing "n" two-dimensional coordinates $(P_m, Q_m)$ (wherein "m"= natural numbers from 1 to "n") in the image-displaying two-dimensional coordinate system;

adjustment input receiving means for designating positions using the "n" two-dimensional coordinates that have been stored in the displayed coordinate storage means, having the computer display images of marks on the display screen that indicate input positions, receiving user operation corresponding to the marks, obtaining "n" input coordinates $(X_m, Y_m)$ that have been detected by the light-transparent two-dimensional coordinate input device, and storing the obtained input coordinates $(X_m, Y_m)$ in the adjustment input coordinate storage means; and a coefficient specifying unit for
  (1) specifying, after the adjustment input receiving means has stored the input coordinates $(X_m, Y_m)$ in the adjustment input coordinate storage means, coefficients of the transform functions F(x,y) and G(x,y) so that the transform functions satisfy expressions $P_m = F(X_m, Y_m)$ and $Q_m = G(X_m, Y_m)$ according to the input coordinates $(X_m, Y_m)$ and the two-dimensional coordinates $(P_m, Q_m)$, and
  (2) recording the coefficients as the setting information file on the storage medium.

3. The input coordinate transformation apparatus according to claim 2, wherein the "n" is equal to 4, the transform function F(x,y) is expressed as "ex+fy+gxy+h" using coefficients "e", "f", "g", and "h", the transform function G(x,y) is expressed as "ix+jy+kxy+l" using coefficients "i", "j", "k", and "l", and the coefficient specifying unit specifies the coefficients "e", "f", "g", "h", "i", "j", "k", and "l", so that the expressions $P_m = F(X_m, Y_m)$ ["m"=1, 2, 3, and 4] and $Q_m = G(X_m, Y_m)$ ["m"=1, 2, 3, and 4] are satisfied according to the input coordinates $(X_m, Y_m)$ ["m"=1, 2, 3, and 4] and the two-dimensional coordinates $(P_m, Q_m)$ ["m"=1, 2, 3, and 4].

4. The input coordinate transformation apparatus according to claim 3, wherein the four two-dimensional coordinates that have been stored in the displayed coordinate storage means are located at vertices of a quadrangle on a two-dimensional coordinate plane.

5. The input coordinate transformation apparatus according to claim 1, wherein the light-transparent two-dimensional coordinate input device is a touch panel that detects positions depressed by a user as input coordinates.

6. An input coordinate transformation method that converts input coordinates (x,y), the input coordinates (x,y) having been detected by a light-transparent two-dimensional coordinate input device provided on a display screen according to reception of user operation, into two-dimensional coordinates in an image-displaying two-dimensional coordinate system that a computer having a storage apparatus uses for designating positions of images on the display screen, and informs the computer of the two-dimensional coordinates, the input coordinate transformation method, comprising:

a transform function specifying step for
  (1) obtaining input coordinates corresponding to three or more positions detected by the light-transparent two-dimensional coordinate input device as a result of user operation in which the user designates the three or more positions, (2) specifying transform functions F(x,y) and G(x,y) according to the input coordinates, each transform function include variables "x" and "y" and terms of first degree for the variables "x" and "y", and (3) recording numerical information that is required for the specification as a setting information file on the storage apparatus; and a coordinate transformation step for (1) accessing, after the numerical information that is required for specifying the transform functions F(x, y) and G(x,y) has been recorded at the transform function specifying step, the setting information file to read the numerical information, (2) converting the input coordinates (x,y) into two-dimensional coordinates (F(x,y), G(x,y)) in the image-displaying two-dimensional coordinate system using the transform functions (F(x,y), G(x,y)) specified by the numerical information, and (3) informing the computer of the two-dimensional coordinates (F(x,y), G(x,y)).

7. The input coordinate transformation method according to claim 6, wherein the transform function specifying step comprises:

an adjustment input receiving step for designating positions using "n" (wherein "n" is a natural number equal to or greater than 3) two-dimensional coordinates ($P_m$, $Q_m$) (wherein "m"=natural numbers from 1 to "n") in the image-displaying two-dimensional coordinate system that have been stored in advance in a memory, displaying images of marks on the display screen that indicate input positions, receiving user operation corresponding to the marks, and obtaining "n" input coordinates ($X_m$,$Y_m$); and a coefficient specifying sub-step for specifying, after the input coordinates ($X_m$,$Y_m$) have been obtained at the adjustment input receiving step, coefficients of the transform functions F(x,y) and Q(x,y) so that the transform functions satisfy expressions $P_m$=F($X_m$,$Y_m$) and $Q_m$=G($X_m$,$Y_m$) according to the input coordinates ($X_m$, $Y_m$) and the two-dimensional coordinates ($P_m$,$Q_m$) and recording the coefficients as the setting information file on the storage apparatus.

8. The input coordinate transformation method according to claim 7, wherein the "n" is equal to 4, the transform function F(x,y) is expressed as "ex+fy+gxy+h" using coefficients "e", "f", "g", and "h", the transform function G(x,y) is expressed as "ix+jy+kxy+l" using coefficients "i", "j", "k", and "l", and the coefficient specifying sub-step specifies the coefficients "e", "f", "g", "h", "i", "j", "k", and "l", so that the expressions $P_m$=F($X_m$,$Y_m$) ["m"=1, 2, 3, and 4] and $Q_m$=G($X_m$,$Y_m$) ["m"=1, 2, 3, and 4] are satisfied according to the input coordinates ($X_m$,$Y_m$) ["m"=1, 2, 3, and 4] and the two-dimensional coordinates ($P_m$,$Q_m$) ["m"=1, 2, 3, and 4].

9. The input coordinate transformation method according to claim 8, wherein the four two-dimensional coordinates that have been stored in advance in the memory are located at vertices of a quadrangle on a two-dimensional coordinate plane.

10. The input coordinate transformation method according to claim 6, wherein the light-transparent two-dimensional coordinate input device is a touch panel that detects positions depressed by a user as input coordinates.

11. A display device that designates positions using an image-displaying two-dimensional coordinate system, displays images on a display screen, converts input coordinates (x,y) in a two-dimensional coordinate system inherent in a light-transparent two-dimensional coordinate input device into two-dimensional coordinates in an image-displaying two-dimensional coordinate system, the input coordinates (x,y) having been detected by the light-transparent two-dimensional coordinate input device provided on the display screen according to reception of user operation, and uses the converted two-dimensional coordinates to match user operation positions and display positions of the images, the display device, comprising:

a storage medium;

the display screen on which the light-transparent two-dimensional coordinate input device is provided;

transform function specifying means for (1) obtaining input coordinates corresponding to three or more positions detected by the light-transparent two-dimensional coordinate input device as a result of user operation in which the user designates the three or more positions, (2) specifying transform functions F(x,y) and G(x,y) according to the input coordinates, each transform function include variables "x" and "y" and terms of first degree for the variables "x" and "y", and (3) recording numerical information that is required for the specification as a setting information file on the storage medium; and coordinate transformation means for (1) accessing the setting information file to read the numerical information, (2) converting the input coordinates (x,y) into two-dimensional coordinates (F(x,y), G(x,y)) in the image-displaying two-dimensional coordinate system using the transform functions specified by the numerical information, and (3) using the two-dimensional coordinates (F,(x,y), G(x,y)).

12. The display device according to claim 11, wherein the transform function specifying means comprises:

adjustment input coordinate storage means that is an area for storing "n" (wherein "n" is a natural number equal to or greater than 3) two-dimensional coordinates;

displayed coordinate storage means for storing "n" two-dimensional coordinates ($P_m$,$Q_m$) in the image-displaying two-dimensional coordinate system;

adjustment input receiving means for designating positions using the "n" two-dimensional coordinates that have been stored in the displayed coordinate storage means, displaying images of marks on the display screen that indicate input positions, receiving user operation corresponding to the marks, obtaining "in" input coordinates ($X_m$,$Y_m$) (wherein "m"=natural numbers from 1 to "n") that have been detected by the light-transparent two-dimensional coordinate input device, and storing the obtained input coordinates ($X_m$,$Y_m$) in the adjustment input coordinate storage means; and a coefficient specifying unit for (1) specifying, after the adjustment input receiving means has stored the input coordinates ($X_m$,$Y_m$) in the adjustment input coordinate storage means, coefficients of the transform functions F(x,y) and G(x,y)

so that the transform functions satisfy expressions $P_i=F(X_m,Y_m)$ and $Q_m=G(X_m,Y_m)$ according to the input coordinates $(X_m,Y_m)$ and the two-dimensional coordinates $(P_m,Q_m)$ and (2) recording the coefficients as the setting information file on the storage medium.

13. The display device according to claim 12, wherein the "n" is equal to 4, the transform function F(x,y) is expressed as "ex+fy+gxy+h" using coefficients "e", "f", "g", and "h", the transform function G(x,y) is expressed as "ix+jy+kxy+l" using coefficients "i", "j", "k", and "l", and the coefficient specifying unit specifies the coefficients "e", "f", "g", "h", "i", "j", "k", and "l" so that the expressions $P_m=F(X_m,Y_m)$ ["m"=1, 2, 3, and 4] and $Q_m=G(X_m,Y_m)$ ["m"=1, 2, 3, and 4] are satisfied according to the input coordinates $(X_m,Y_m)$ ["m"=1, 2, 3, and 4] and the two-dimensional coordinates $(P_m,Q_m)$ ["m"=1, 2, 3, and 4].

14. The display device according to claim 13, wherein the four two-dimensional coordinates that have been stored in the displayed coordinate storage means are located at vertices of a quadrangle on a two-dimensional coordinate plane.

15. The display device according to claim 11, wherein the light-transparent two-dimensional coordinate input device is a touch panel that detects positions depressed by a user as input coordinates.

16. In a computer-controlled image-displaying two-dimensional coordinate system having a storage medium, a method for converting input coordinates (x,y) into two-dimensional coordinates, said input coordinates (x,y) having been detected by a two-dimensional coordinate input device responding to user operation, said method comprising the steps of:

a) obtaining input coordinates corresponding to three or more positions detected by said input device as a result of user operation in which the user designates said three or more positions, b) specifying transform functions F(x,y) and G(x,y) according to said input coordinates, wherein each transform function includes variables "x" and "y" and terms of first degree for the variables "x" and "y";

c) recording numerical information required for the specification as setting information and storing in an information setting file in said storage medium;

d) accessing said information setting file to read the numerical information;

d) converting the input coordinates (x,y) into two-dimensional coordinates (F(x,y), G(x,y)) in the image-displaying two-dimensional coordinate system using the transform functions specified by the numerical information; and, f) informing the computer-controlled system of the two-dimensional coordinates (F(x,y), G(x,y)).

17. The method according to claim 16, further comprising the steps of:

g) storing "n" two-dimensional coordinates in an adjustment input coordinate storage area of said storage medium (wherein "n" is a natural number equal to or greater than 3);

h) storing "n" two-dimensional coordinates $(P_m,Q_m)$ in the image-displaying two-dimensional coordinate system (wherein "m"=natural numbers from 1 to "n");

i) designating positions using the "n" two-dimensional coordinates that have been stored in the displayed coordinate storage means, having the computer-controlled system display images of marks on the display screen that indicate input positions, receiving user operation corresponding to the marks, obtaining "n" input coordinates $(X_m,Y_m)$ that have been detected by the light-transparent two-dimensional coordinate input device, and storing the obtained input coordinates $(X_m,Y_m)$ in the adjustment input coordinate storage means;

j) specifying, after the adjustment input receiving means has stored the input coordinates $(X_m,Y_m)$ in the adjustment input coordinate storage means, coefficients of the transform functions F(x,y) and G(x,y) so that the transform functions satisfy expressions $P_m=F(X_m,Y_m)$ and $Q_m=G(X_m,Y_m)$ according to the input coordinates $(X_m,Y_m)$ and the two-dimensional coordinates $(P_m,Q_m)$; and, k) recording the coefficients as the setting information file on the storage medium.

18. A storage medium encoded with machine-readable computer program code for converting input coordinates (x,y) into two-dimensional coordinates, said input coordinates (x,y) having been detected by a two-dimensional coordinate input device responding to user operation, when the program code is executed by a computer-controlled image-displaying two-dimensional coordinate system, the system performs the steps of:

a) obtaining input coordinates corresponding to three or more positions detected by said input device as a result of user operation in which the user designates said three or more positions, b) specifying transform functions F(x,y) and G(x,y) according to said input coordinates, wherein each transform function includes variables "x" and "y" and terms of first degree for the variables "x" and "y";

c) recording numerical information required for the specification as setting information and storing in an information setting file in a storage device;

d) accessing said information setting file to read the numerical information;

d) converting the input coordinates (x,y) into two-dimensional coordinates (F(x,y), G(x,y)) in the image-displaying two-dimensional coordinate system using the transform functions specified by the numerical information; and, f) informing the computer-controlled system of the two-dimensional coordinates (F(x,y), G(x,y)).

19. he medium according to claim 18, further comprising the steps of:

g) storing "n" two-dimensional coordinates in an adjustment input coordinate storage area of said storage device (wherein "n" is a natural number equal to or greater than 3);

h) storing "n" two-dimensional coordinates $(P_m,Q_m)$ in the image-displaying two-dimensional coordinate system (wherein "m"=natural numbers from 1 to "n");

i) designating positions using the "n" two-dimensional coordinates that have been stored in the displayed coordinate storage means, having the computer-controlled system display images of marks on the display screen that indicate input positions, receiving user operation corresponding to the marks, obtaining "n" input coordinates $(X_m,Y_m)$ that have been detected by the light-transparent two-dimensional coordinate input device, and storing the obtained input coordinates $(X_m,Y_m)$ in the adjustment input coordinate storage means;

j) specifying, after the adjustment input receiving means has stored the input coordinates $(X_m, Y_m)$ in the adjustment input coordinate storage means, coefficients of the transform functions $F(x,y)$ and $G(x,y)$ so that the transform functions satisfy expressions $P_m = F(X_m, Y_m)$ and $Q_m = G(X_m, Y_m)$ according to the input coordinates $(X_m, Y_m)$ and the two-dimensional coordinates $(P_m, Q_m)$; and, k) recording the coefficients as the setting information file on said storage device.

* * * * *